US012748712B2

(12) United States Patent
Shahar et al.

(10) Patent No.: US 12,748,712 B2
(45) Date of Patent: Sep. 29, 2026

(54) SCALABLE AND CONFIGURABLE NON-TRANSPARENT BRIDGES

(71) Applicant: MELLANOX TECHNOLOGIES, LTD., Yokneam (IL)

(72) Inventors: Ariel Shahar, Jerusalem (IL); Peter Paneah, Nesher (IL); Vladimir Vainer, Kiryat Shmona (IL); Afek Bernhard, Tzur Hadassa (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 18/477,162

(22) Filed: Sep. 28, 2023

(65) Prior Publication Data

US 2025/0110907 A1 Apr. 3, 2025

(51) Int. Cl.
*G06F 13/40* (2006.01)
*G06F 13/42* (2006.01)

(52) U.S. Cl.
CPC ...... *G06F 13/4027* (2013.01); *G06F 13/4221* (2013.01); *G06F 2213/0026* (2013.01); *G06F 2213/40* (2013.01)

(58) Field of Classification Search
CPC ............. G06F 13/4221; G06F 13/4027; G06F 2213/0026; G06F 2213/40
See application file for complete search history.

(56) References Cited

U.S. PATENT DOCUMENTS 6,581,130 B1 6/2003 Brinkmann, Jr. et al.
8,407,377 B1 * 3/2013 Shapiro ................... G06F 3/067 711/5
9,336,173 B1 * 5/2016 Sodke ................... G06F 3/0665
9,910,808 B2 * 3/2018 Gaither ............... G06F 13/1652
10,419,339 B2 * 9/2019 Krause .................... H04L 63/08
10,922,259 B2 * 2/2021 Shao .................. G06F 13/4045
2006/0282603 A1 12/2006 Onufryk et al.
2008/0209099 A1 8/2008 Kloeppner et al.
2011/0167189 A1 7/2011 Matsubara et al.
2014/0101347 A1 * 4/2014 Chandhoke ........... G06F 13/404 710/26
2014/0237156 A1 8/2014 Regula et al.
2014/0281106 A1 9/2014 Saghi et al.

(Continued)

OTHER PUBLICATIONS

Notice of Allowance issued in U.S. Appl. No. 18/476,836, dated Sep. 2, 2025.

*Primary Examiner* — Henry Tsai
*Assistant Examiner* — Christopher A Daley
(74) *Attorney, Agent, or Firm* — Hogan Lovells Cadwalader US LLP

(57) ABSTRACT

Systems and methods herein are for a Non-Transparent Bridges (NTBs) that are scalable and configurable to use equally sized or spaced windows and a common lookup database for remapping writes without completions. The equally sized or spaced windows in the address space are addressable by a starting address and a size to support communication between host machines or endpoints. The common lookup database is to allow selection of one the windows associated with a mapping between address spaces of different domains and is also to accept remapping writes through the at least one NTB to modify the mapping without need for a completion to be returned to a source of the remapping writes.

17 Claims, 7 Drawing Sheets

(56) References Cited

U.S. PATENT DOCUMENTS

| | | | | |
|---|---|---|---|---|
| 2015/0026384 | A1* | 1/2015 | Maitra | G06F 12/1081<br>710/313 |
| 2015/0261709 | A1* | 9/2015 | Billi | G06F 13/404<br>710/316 |
| 2020/0226078 | A1* | 7/2020 | Tanaka | G06F 12/0806 |
| 2021/0124706 | A1* | 4/2021 | Meyer | G06F 13/4234 |

* cited by examiner

SCALABLE AND CONFIGURABLE NON-TRANSPARENT BRIDGES

TECHNICAL FIELD

At least one embodiment pertains to addressing that is scalable and configurable in peripheral component interconnect express (PCIe®) Non-Transparent Bridges (NTBs).

BACKGROUND

An NTB provides a way to connect together two or more component domains, such as two or more PCIe® component domains. Each component domain, also referred to herein as a domain, has a root complex. A root complex may be a device that connects a central processing unit (CPU) and associated memory to a switch (or switch fabric) that may include one or more other devices or endpoints. The CPU and associated memory may be part of a host, which is also referred to herein as a host machine. A root complex provides a root in a hierarchy of the domain. As such, each hierarchy may include only one host. An NTB enables connectivity between hierarchies or domains by presenting, to each one of the hierarchies or domains, a "door" to cross to the other hierarchy. The NTB complies with domain rules on each one of the fabric to which it connects. While an NTB enables address ranges that can be transferred between fabrics associated with the NTB, these address ranges tend to be small in number relative to the devices intending to connect to a host or to one of the fabrics. In addition, NTB configurations, such as modifications to an address range within the NTB may be performed by a configuration write, which may be a slow operation according to the domain rules because of the need for a completion while following a control path operation that is a time and bandwidth-consuming procedure.

DETAILED DESCRIPTION

Figure 1:
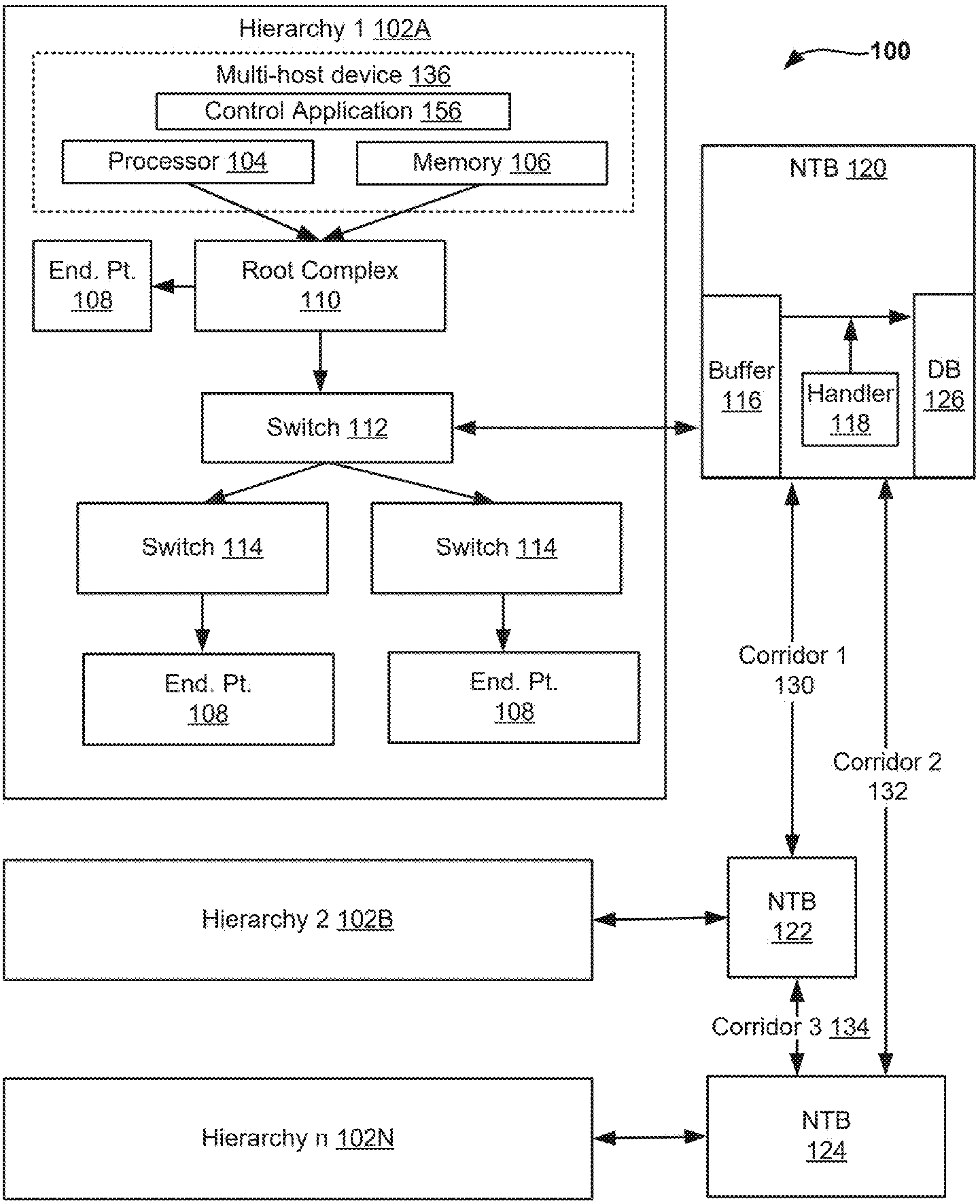
FIG. 1 illustrates a system that is subject to embodiments of scalable windows and modifiable mapping for peripheral component interconnect express non-transparent bridges.

FIG. 1 illustrates a system 100 that is subject to embodiments of scalable windows and modifiable mapping for non-transparent bridges (NTBs), as detailed herein. An NTB may be used with a or other component domain that is a system interconnect used to provide peer communications between different processors of the different hierarchies or domains 1-n 102A-N. The system 100 includes one or more hierarchies or domains 1-n 102A-N, with each hierarchy including a root complex 110, switches 112, 114, associated end points 108 (also referred to herein as EPs), and at least one distinct NTB end point 120 (also referred to herein as NTBs). The components listed against hierarchy or domain 1 102A are similarly found in the other hierarchies or domains 1-n 102A-N. Therefore, a reference to a component of a reference numeral but to different hierarchies will be understood as a different component but that is able to perform similar functions as the components described with respect to a hierarchy or domain 1 102A. In at least one embodiment, at least one EP 108 may be part of or may be associated with a multi-host device 136 (also referred to herein as a host or a host machine) that further includes or is associated with at least one processor 104 and with a provided memory 106. A multi-host device 136 can present itself as an available device, simultaneously, on multiple independent hierarchies or domains 2-n 102B-N from within its own independent hierarchy or domain 1 102A.

In at least one embodiment, the system 100 and its associated method provide improvements to NTBs 120-124 by including a mapping in an NTB that is between address spaces of different hierarchies or domains 1-n 102A-N and that uses partitions in the address space. This is detailed further in FIGS. 2-6 herein. The partitions define a starting address and a size in the address space. The starting address and size provide windows that are equally sized or spaced. The windows are to be used for communication between different hierarchies or domains 1-n 102A-N by providing address translation for incoming packets using specific addresses within the windows. This allows scaling of address-ranges for communications in the component networks.

In at least one embodiment, the system 100 and its associated method provide further improvements to NTBs 120-124 by allowing routing of remapping writes and data accesses (including data writes, reads, and atomics) in NTBs 120-124. This routing is performed, in part, by applying at least one common lookup database. For example, the at least one common lookup database (DB) 126 can be used to allow selection of a window context associated with the mapping between the address spaces of different hierarchies or domains 1-n 102A-N. This is also detailed further in FIGS. 2-6 herein for the data accesses. In addition, the common lookup DB 126 can be modified by a sequence of remapping writes to a control BAR. At least one window context, associated with a window of a data BAR, can be modified by a remapping write applied to a control BAR. As the common lookup DB 126 is accessed, the processing of remapping writes to a control BAR proceeds in a manner such that there is no need for a polling sequence that ensures completion of the remapping write.

These improvements to NTBs herein can address handling-limits for communications between hierarchies or domains 1-n 102A-N and related applications in view of number of windows otherwise used. For example, some NTBs 120-124 may occupy a large number of windows than required for an extended period. The use of partitions, to map address spaces where the partitions use at least a start address and a size to which all windows within the partition are evenly spaced or sized forms a simpler address translation as there is no need to include start and end addresses for each package. This allows scaling of address-ranges for communications in the component networks as a number of windows can be scaled altogether by adjustments to the same size based in part on requirements for translation. Moreover, for remapping writes to modify a window context, the need for completions causes bandwidth traffic and other slowness. The use of back-to-back writes that guarantee to take effect in accordance with ordering rules, saves bandwidth and any slowness to enable configuration changes.

The system 100 includes a multi-host device 136 of one hierarchy or domain 1 102A that can present a switch 112 to some of root complexes 110 of the different hierarchies or domains 2-n 102B-N. For example, the multi-host device 136 can present a switch 112 to an ARM processor of a system-on-chip (SoC) root complex 110 and can also present the switch 112 to an external host of a different one of the hierarchies or domains 2-n 102B-N. Each of the hierarchies or domains 1-n 102A-N may be associated with a processor and memory as in the illustrated hierarchy of FIG. 1. Further, the memory 106 in FIG. 1 is either shared or part of a host machine (or a host) or is either shared or part of a root complex 110.

There may be single or a multi-processor system providing a root complex 110. In one example, a single processor may be also a host processor 104 that acts as the root complex 110. The processor 104, in such an example, may be associated with at least one upstream port of a switch 112 and may control aspects of initialization for the system 100. A switch 112 may be a multi-port switch to bring together multiple EPs 108. Each EP 108 may include a corresponding processor in the system 100. Connectivity between two root complexes 110 of hierarchies or domains 1-n 102A-N may be possible using a network established between the two hierarchies or domains 1-n 102A-N using the NTBs 120-124.

In at least one embodiment, each of the NTB 120-124 individually provide non-transparent bridging with further improvements in using single sized or spaced windows and in allowing remapping of address spaces, as described throughout herein. For example, an NTB may be a device or may be performed by a function. The function may be a virtual function providing a virtual port that exists with an upstream port of a switch. Each virtual function may appear as an NTB 120; 122; 124 or even an EP 108. A virtual function may be associated with a virtual interconnect within a switch 112 which may not be visible to the hierarchy or domain 1-n 102A-N. However, this approach allows communication from the virtual function to other virtual functions and is detailed further with respect to at least FIG. 3B herein. A virtual function is able to access provided memory 106 of the system and is able to access internal functionality of the device to which it is a part. This allows a virtual function to execute access to another hierarchy, such as one that is outside of the device to which it is a part. Such other hierarchy may be referred to herein as a remote or destination domain.

In at least one embodiment, NTB aspects may be performed in a network interface card (NIC) as a function of the NIC, such as a virtual function or an NTB function. Further, some NTB aspects may be only in a target or destination of a fabric or only in an initiator or source of the fabric. Then, such NTB aspects may only bridge transactions from one side to another but cannot perform in the opposite direction. However, in the system 100 for scalable windows and modifiable mapping, full duplex is enabled such that each hierarchy or domain 1-n 102A-N may include a single NTB function that can operate as both a initiator or source and a target or destination. Therefore, at any point during communications, an NTB 120; 122; 124 of a hierarchy or domain 1 102A; 2 102B; n 102N can be designated as an initiator or source so that its domain is designated as SRC_PCI_DOMAIN or can be a destination or target so that its domain is designated as DST_PCI_DOMAIN.

When in an initiator role, an NTB 120; 122; 124 can generate write accesses that may be READS/WRITE/ATOMIC packets (all such packets referred to herein as transaction layer packets (TLPs)) on a destination or target hierarchy or domain 1 102A; 2 102B; n 102N (DST_PCI_DOMAIN). As used herein, a PCI_DOMAIN is in reference to a hierarchy or domain 1-n 102A-N that has a single root complex 110 and that may have any topology of switches 121 and devices, such as EPs 108. Then, as used herein, a DST_PCI_DOMAIN is in reference to a destination PCI_DOMAIN acting as a target and to which an NTB sends a TLP that has been accepted in the NTB from the SRC_PCI_DOMAIN A TLP to a DST_PCI_DOMAIN is one that originated from outside the DST_PCI_DOMAIN, such as, from another hierarchy or an initiator or source. Separately, when in a target role, an NTB 120; 122; 124 can claim transactions that contact its base address register (BAR) on a source hierarchy or domain 1 102A; 2 102B; 1 102N (SRC_PCI_DOMAIN). An NTB 1 102A; 2 102B; n 102N is enabled to handle these transactions using a handler 118, such as, to move certain transactions further in a network to a DST_PCI_DOMAIN. However, remapping writes are control transactions that may not be moved further, may not be subject to translations, and may be processed in a receiving NTB 1-n 102A-N after determining the window context of a corresponding data BAR window to be changed. For example, the remapping write is to a corridor_handshake section (as detailed in FIGS. 3A and 3B) of a control BAR that corresponds to a window inside a partition to be configured or reconfigured. Therefore, as used herein, an SRC_PCI_DOMAIN is a PCI_DOMAIN from which an NTB receives certain TLP, such as a READ/WRITE/ATOMIC that should be transmitted or jumped to another hierarchy.

Figure 3A:
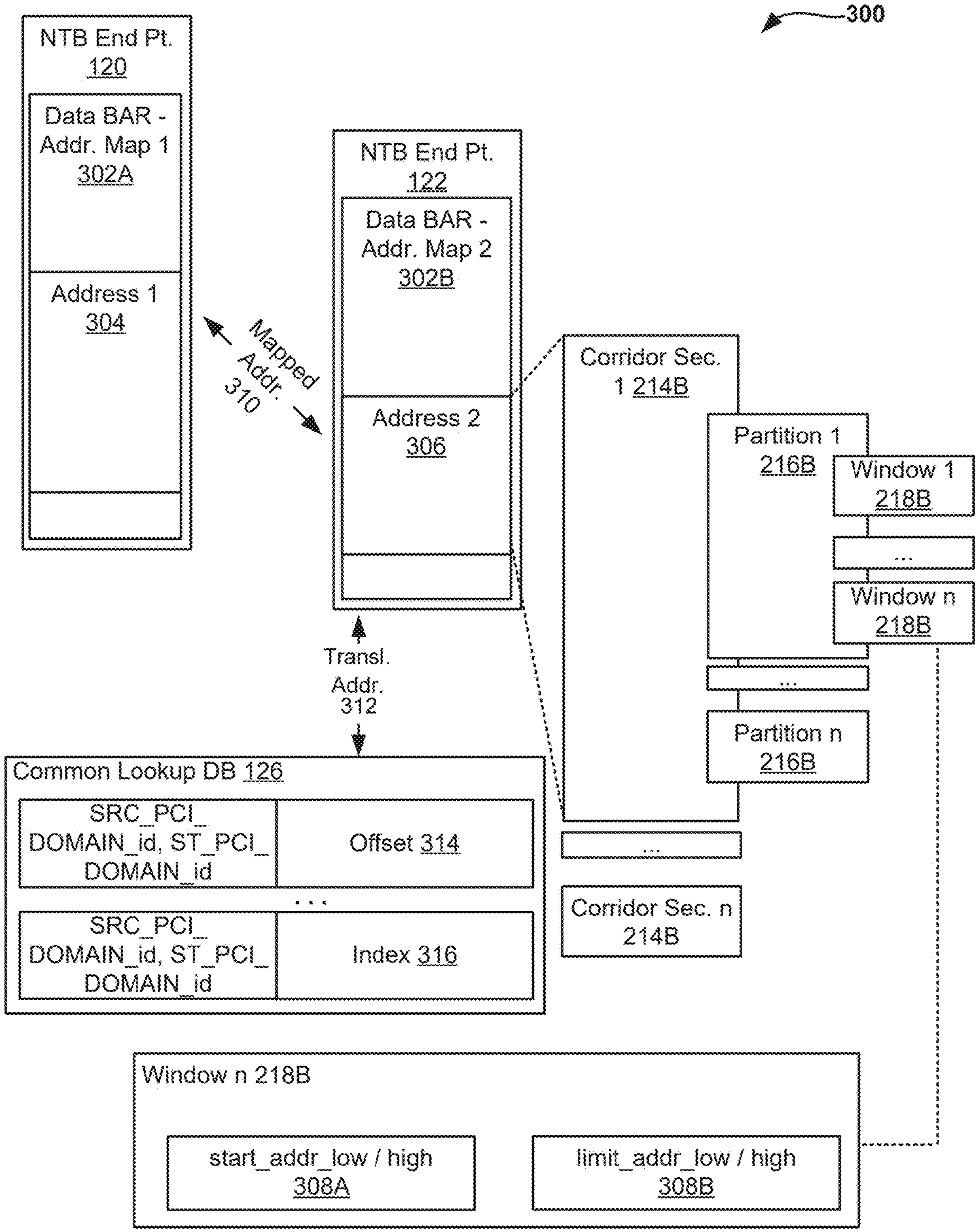
FIG. 3A illustrates aspects associated with data Base Address Registers (BARs) of a system having scalable windows and modifiable mapping for peripheral component interconnect express non-transparent bridges, according to at least one embodiment.
Figure 3B:
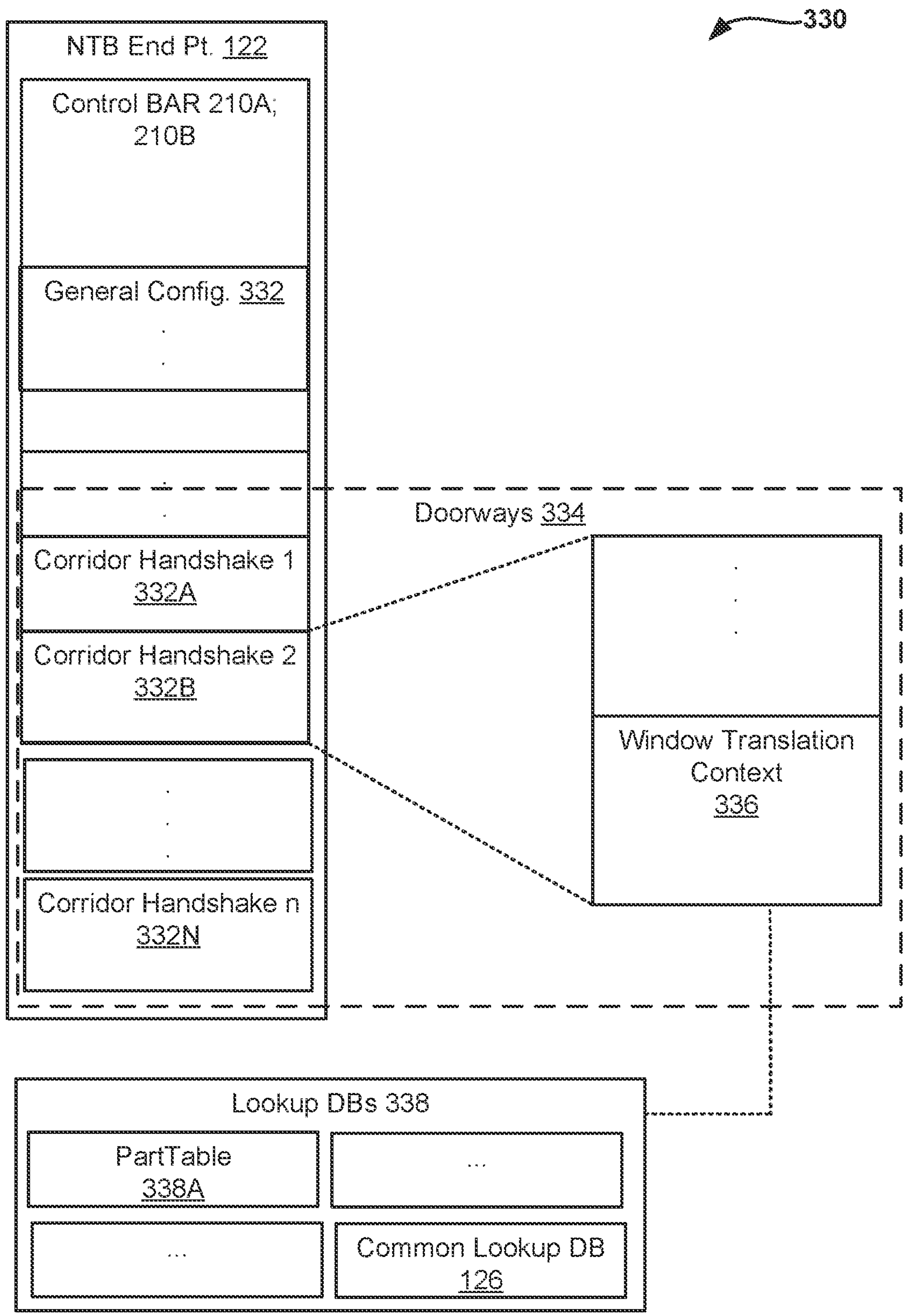
FIG. 3B illustrates aspects associated with control Base Address Registers (BARs) of a system having scalable windows and modifiable mapping for peripheral component interconnect express non-transparent bridges, according to at least one embodiment.

In at least one embodiment, a handler 118 may be an execution unit of a processor to perform lookup functions using a database (DB) 126, such as, a common lookup database, as in FIGS. 3A and 3B. Incoming TLPs may be stored in an order, as they come in, in a buffer 116. Then, the handler 118 may maintain the order in which the TLPs are performed for the data accesses and for the write remapping, which is in accordance to the order in which the TLPs are received. The handler 118 is able to use the DB 126 to determine how to route the TLPs, including to determine the window for address translation, for at least the data access TLPs from a buffer 116 of the NTB 120. Therefore, following an order of when the respective TLPs come in to the buffer 116, it is possible for a remapping write TLP to a control BAR to be applied upon receipt in the control BAR. This is such that a first data access TLP, prior to the remapping write TLP being applied, is translated by a first translation of a window. Then, a second data access after the remapping write is applied is translated using a second translation of the window. As the data accesses continue to occur, this is sufficient acknowledgement of the remapping being completed successfully without need for a completion to be returned to a source of the remapping writes.

As to write parts of the control access TLPs, these may be treated as posted transactions. In at least one embodiment, a remapping write TLP can be used to perform the remapping write to remap in an NTB where a completion is not required. Such a remapping write is different from a configuration write of the standard for which a completion is required. In at least one embodiment, each NTB 1 102A; 2 102B; n 102N between two or more hierarchies or domains 1-n 102A-N may be part of one or more corridors 1-3 130-134. A corridor 1 130; 2 132; 3 134, as used herein, is a collection of hard and soft features required to enable communication between two PCI_DOMAINs 1-n 102 A-N. A corridor may, therefore, include references to data wires, as well as the configuration and databases on both PCI_DOMAINs that are connected and that may be enabled in part using a control BAR. For a data BAR, the corridor corresponds to partitions having windows therein that may be subject to reconfiguration, as described further in FIGS. 2, 3A. The configuration or reconfiguration is responsible for bridging functionality between the two hierarchies or domains. This is in addition to enabling the data path between the two hierarchies or domains.

An NTB or a device that is capable of NTB functions may provide a singular corridor 1 130; 2 132; 3 134 to bridge between two hierarchies or domains. Further, to bridge between three hierarchies or domains with all-to-all connectivity, however, each pair of hierarchies or domains is provided with a corridor, such as corridor 1 130 and corridor 2 132 that are distinct corridors from one NTB 120 to two other NTBs 122, 124. Therefore, each NTB presents two doorways and a total of three corridors may be provided for three hierarchies or domains. As used herein, a doorway is in reference to at least soft features that are part of a corridor but are primarily at one of a corridor's ends and that are tied to a respective PCI_DOMAINs 1 102A; 2 102B; n 102N. In at least one embodiment that uses four hierarchies or domains, each NTB will be required to present three doorways, with a total of six corridors; but this approach extends proportionally to even more hierarchies or domains to be networked together.

Figure 2:
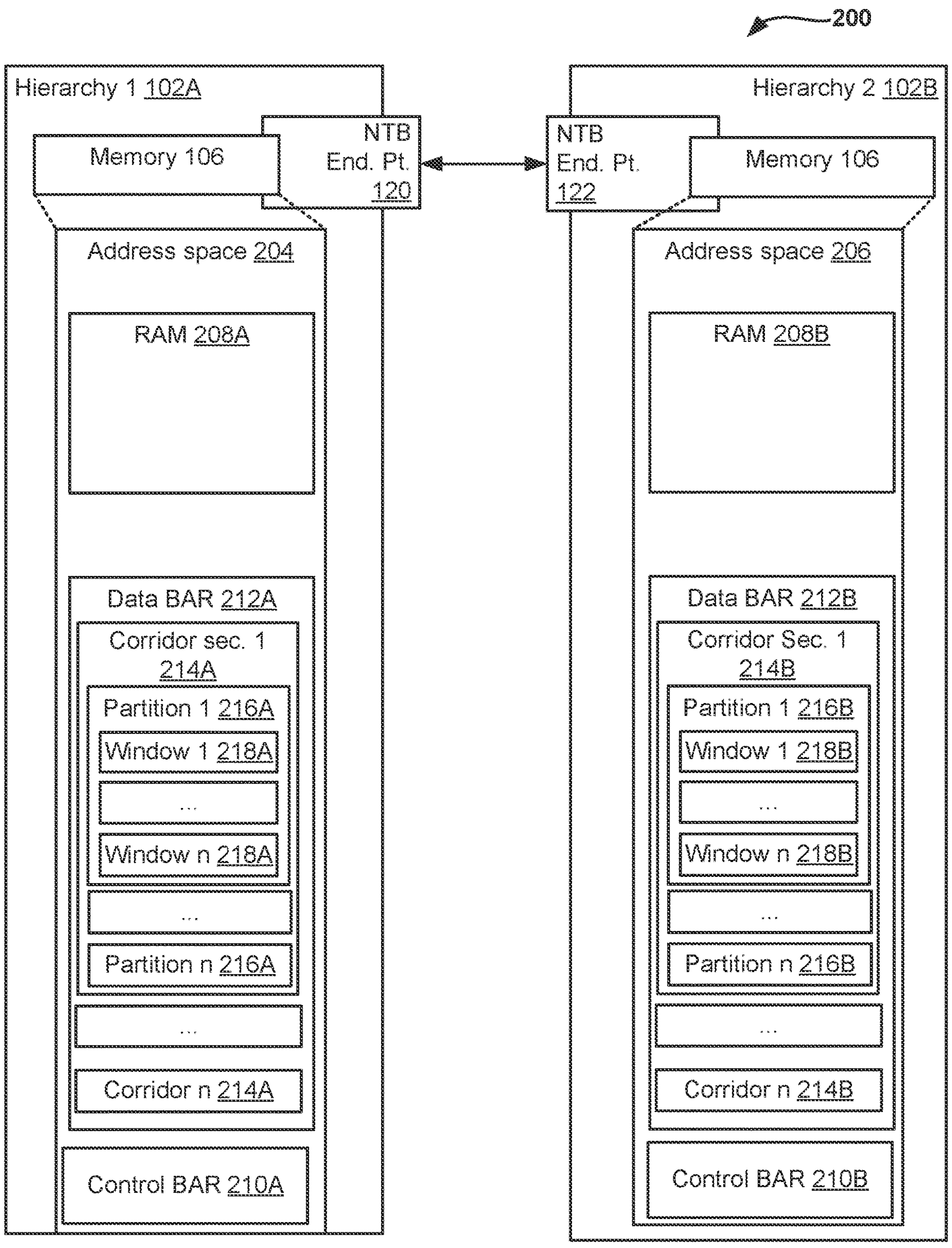
FIG. 2 illustrates aspects of a system associated with scalable windows and modifiable mapping for peripheral component interconnect express non-transparent bridges, according to at least one embodiment.

FIG. 2 illustrates aspects 200 of a system associated with scalable windows and modifiable mapping for peripheral component interconnect express non-transparent bridges, according to at least one embodiment. Particularly, FIG. 2 illustrates address spaces 204; 206 pertaining to scalable windows 1-n 218A; 218B associated with the memory 106 in each NTB 120; 122; 124. The windows, in each partition, may be configured by a host of either one of the hierarchy or domain 1 102A; 2 102B that are to be in a network. In at least one embodiment, the window spacing may be initialized by a host of one of the hierarchies or domains in communication. Further, the address spaces 204, 206 may be within individual memories 106 of a respective host and, as such, at least one individual memory 106 may be a random access memory (RAM) memory. Further, the address spaces 204, 206 may include a RAM section 208A, B that may be unavailable to the interface.

Each address space 204; 206 of each NTB 120; 122; 124 may be associated with at least a data BAR and a control BAR 212A; 210A; 212B; 210B. For example, at least one provided BARs 212A; 212B, may be designated as BAR0-1, and may be used for data aspects, including for data transfer, which is a primary objective of an NTB. At least other provided control BARs 210A; 210B, designated as BAR2-3, may provide control or configuration, which may be used for control structures and operations for the NTB, in one example. In at least one embodiment, aspects of the control BAR 210A; 210B are distinct for allowing remapping, relative to the one or more data BARs 212A; 212B. Further, access configurations for a control BAR may be changed by writing to a corresponding part of the control BAR, such as to a corridor_handshake section of the control BAR, as described further and detailed with respect to at least FIG. 3B herein.

In at least one embodiment, the separation of the BARs to be data BARs separate from a control BAR allows for robustness by removing any possibility of alignment issues between different data BARs and for control or configuration information. Otherwise, such control and configuration information may be broken, even if by a small fraction, such as in a beginning (or end or other place), of a data BAR is used for control or configuration. This may be of value when defining other control BARs, such as a virtual function BAR (VF_bar), where a VF driver is expected to be associated with a BAR that does not have a control section or area. This makes the entire BAR, which may be a VF BAR, into a data BAR.

A data BAR 212A; 212B may be further divided into sections, such as corridor sections 1-n 214A; 214B, which are further divided into partitions 1-n 216A; 216B, and which in turn are further divided into windows 1-n 218A; 218B (also called translation windows). The corridor sections 1-n 214A; 214B here may correspond to the corridors 1-3 130-134 illustrated between the different NTBs 120; 122. However, the division of the corridor to form the partitions is such that each corridor is divided into equal-sized partitions 1-n 216A; 216B. Further, each partition 1-n 216A; 216B is divided into equal-sized windows 1-n 218A; 218B.

FIG. 3A illustrates aspects 300 associated with data BARs of a system having scalable windows and modifiable mapping for peripheral component interconnect express non-transparent bridges, according to at least one embodiment. In at least one embodiment, address translation may be provided within a root complex 110 to connect together two NTBs 120, 122, with different EPs 108 coupled to at least one of the two NTBs to be a target or an initiator of some part of the communication. For example, a first NTB 120 may couple to a second NTB 122 at a provided ports of each of the NTBs. A further NTB 124 may couple to another port of the same NTB 122.

A sweep of all coupled devices may be performed such that each root complex 110 in each hierarchy or domain 1-n 102A-N is able to create and receive addresses to be associated with a memory mapping between at least two NTBs 120, 122. For example, each NTB 120, 122 can create windows 1-n 218A, 218B to access each other's address spaces 204, 206. The windows 1-n 218A, 218B may be associated with inbound and with outbound communication. Further, the windows 1-n 218A, 218B allow each NTB 120, 122 to access the other's local memory 106. In at least one embodiment, there may be a default window for each of the NTBs that may be directed to control configurations or other data communications.

Further, individual ones of the partitions 1-n 216A; 216B include windows 1-n 218A; 218B that are equally sized or spaced in the address space. As such, the windows 1-n 218A; 218B are addressable by a starting address and a size. The windows 1-n 218A; 218B can support communication, such as, at least outgoing data communication between PCI_DO- MAINs, and thus, between host machines or EPs 108. The windows 1-n 218A; 218B may be allocated memory regions of the memory 106. In at least one embodiment, a window 1-n 218A of an address space 204 and associated with a first address 304 and with a first PCI_DOMAIN may be mapped as a mapped address 310 to a window 1-n 218B of a second PCI_DOMAIN having a second address 306. In at least one embodiment, each window 1-n 218A; 218B may include parameters 308A, B needed to translate 312 an address or an identifier of a TLP from a first hierarchy or domain 1 102A (an SRC_PCI_DOMAIN) to a second hierarchy or domain 2 102B (a DST_PCI_DOMAIN) for outgoing TLPs.

The parameters 308A, B may be associated with a window translation context 336, as detailed further in FIG. 3B. The window translation context may be associated with a Write Enable ("WE") parameter that, when 0, indicates that a WRITE instruction or packet that hits the window will be considered a Non-Existing-Address access. A Read Enable ("RE") parameter of the window translation context is such that, when it is 0, a READ instruction or packet that hits the window will be considered a Non-Existing-Address access. Other ENABLE parameters are possible for the window translation context, such as ATOMIC enable. In at least one embodiment, a size of the window 1-n 218A; 218B is provided inside the window translation context A minimum between this value and a Log 2 of the size of the window of a partition provides an amount of address-related least significant bits (LSBits) that can be taken as-is from a translation of SRC_PCI_DOMAIN to DST_PCI_DOMAIN.

In at least one embodiment, some TLPs may rely on a bus, device, and function (BDF) identifier in their communication and translations, whereas other TLPs may rely on addresses, including start_addr 308A and limit_addr 308B parameters. The address parameters 308A, B may include bits provided in the window translation context. This enables access to a window that results in a translation that is outside the start_addr/limit_addr boundaries, which will be considered non-existing-address accesses. In at least one embodiment, an individual window 218B enables determination of a translation 312 of an address or an identifier to be used with a communication that includes a TLP. Further, in at least one embodiment, the common lookup database 126 may include one or more entries that are based in part on an offset 314 of an address for data accesses. Separately, the one or more entries may be selected by one or more indices 316 provided by a control application 156 for at least one of the remapping writes. In addition, the entries may be accessed using source and destination domain identifiers, as illustrated.

In at least one embodiment, the system 300 also include support for an option to have a single corridor 1 130; 2 132; 3 134 associated with address maps or tables 1 302A, 2 302B. This is in addition to having a multi-function NTB that will present a function per corridor 1-n 214B. Therefore, an SRC_PCI_DOMAIN 122, under this option, will be able to penetrate to another domain—for example, to multiple DST_PCI_DOMAINs 120, 122, 124, each one of the DST_PCI_DOMAINs through a separate function, rather than through different locations on a BAR of a single function.

FIG. 3B illustrates aspects 330 associated with control Base Address Registers (BARs) of a system having scalable windows and modifiable mapping for peripheral component interconnect express non-transparent bridges, according to at least one embodiment. One of the parameters in the control BAR 210A; 210B is a corridor_handshake section 1-n 332A-N that may correspond to each available corridor section 1-n 214A; 214B of each data BAR 212A; 212B. Each corridor_handshake section 1-n 332A-N may be deployed on 4 Kbyte section of the control BAR 210A; 210B. This is in order to enable separation and isolation of the entities controlling a respective doorway 334 associated with a corridor 1 130; 2 132; 3 134 (also with corridor section 1-n 214A; 214B) of a data BAR 212A; 212B.

In one example, a rewriting or data access TLP may be examined according to an address by a handler 118 and using a full address may be provided with the TLP. When the host, represented by a processor 104, determines that the TLP is intended for a data and control BAR 212A; 212B; 210A; 210B, the TLP may be delivered to the NTB 122 that is associated with the host. Then, a corridor section 1-n 214B associated with the address or identifier of the TLP is used to determine the DST_PCI_DOMAIN to which the TLP will be sent. Therefore, different corridor sections 1-n 214B can either be on same NTB function or on different NTB functions. Further, a partition 1-n 216B associated with the TLP determines the window size to be used for the TLP. The window 1-n 218B addressed within the partition 1-n 216B provides the translation of Address, as needed for the TLP.

In at least one embodiment, the window size determines the aligned block which has a single translation for all of its addresses. As such, a single translation may include a specific address using MSBits value. The number of MSBits that are taken from the window translation context 336 may be according to the window size. Further, when the TLP is a remapping write TLP that is directed to a control BAR and that is targeting a specific window translation context, it may also include an "RL"=1 value. This means that this TLP wants to modify a window that belongs to the opposite-side doorway 334. Further, the common lookup DB 126 may be a shared and sectioned database that is enabled for multiple accesses in a clock cycle, as needed to provide translations or routing for different TLPs.

In at least one embodiment, the common lookup DB 126 is sectioned to different domains 102A-N. A data access for a domain can be routed to an individual corridor section 214B of multiple corridor sections. Further, as detailed in at least FIG. 2, the individual corridor section enables determination of a domain to be associated with the data access. Then, individual partitions of a multiple available partitions within the individual corridor section enables determination of a window size to be associated with the data access. The individual window of the window size enables determination of a translation of an address or an identifier to be used with the data access.

In at least one embodiment, the remapping writes to a control BAR can take effect immediately. This means that a remapping write can travel through the same pipe (or use at least a common lookup database) that is used by data access TLPs. Further, while the control access to the control BAR uses one or more of the same lookup DBs 338, as a data access, the control access may take the indices differently. For example, there may be at least the common lookup DB 126, but there may be two or more other databases, including a PartTable 338A to provide a partition having the entry in DB intended to be used for the translation of an address or identifier associated with the TLP. In at least one embodiment, non-existing address indications may occur, as described with respect to at least FIG. 1, when a TLP targets a translation window that is non-active or when a request TLP arrives in an NTB for an address that is not translated. That is, when an active translation for window is non-existent, the request may be logged as a transaction in a log buffer, may be reported to a firmware-related register, and may be dropped in the case of a data WRITE, or responded with an arbitrary completion in the case of a READ/ATOMIC.

Figure 4:
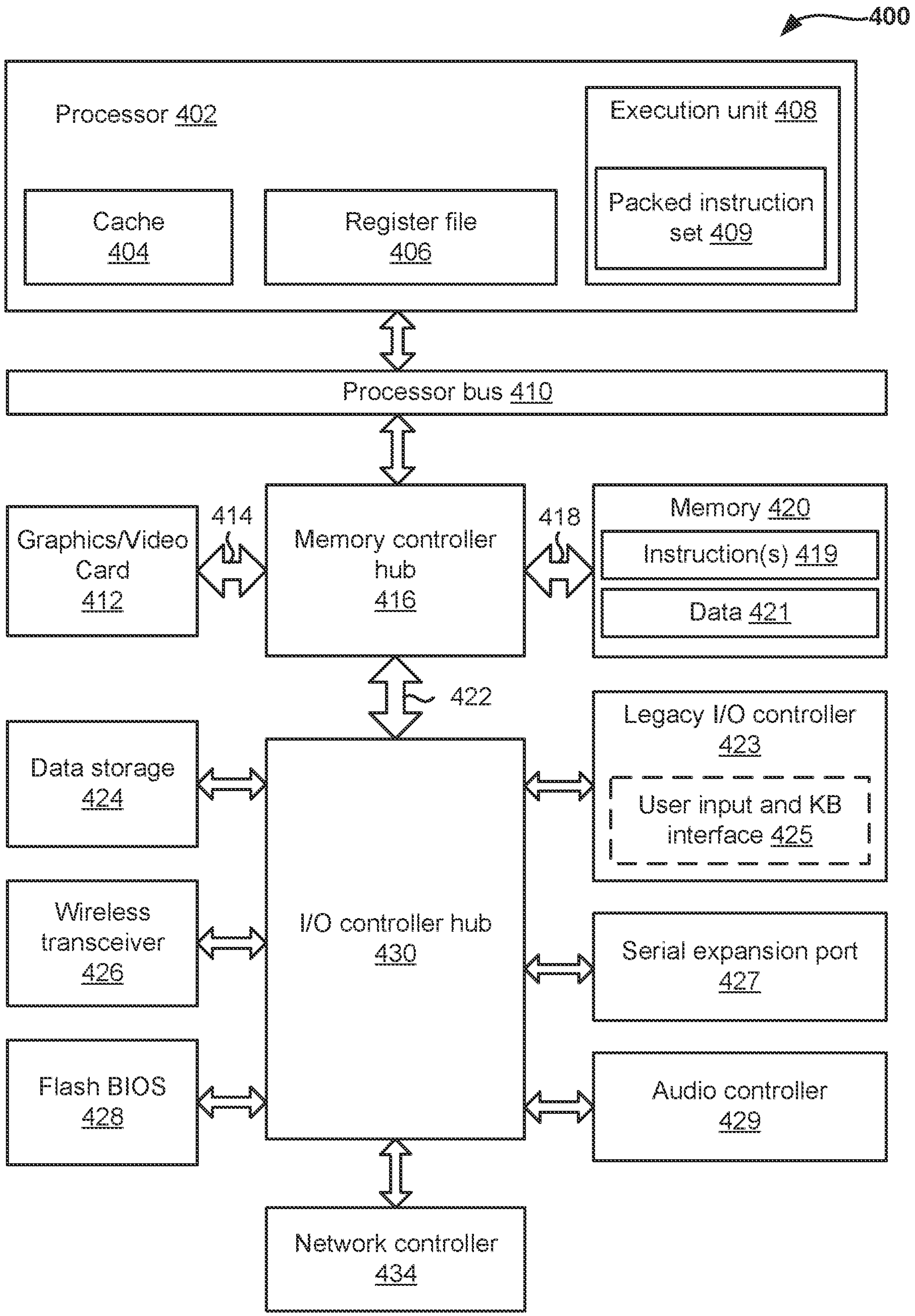
FIG. 4 illustrates computer and processor aspects of a system associated with scalable windows and modifiable mapping for peripheral component interconnect express non-transparent bridges, according to at least one embodiment.

FIG. 4 illustrates computer and processor aspects 400 of a system associated with scalable windows and modifiable mapping for peripheral component interconnect express non-transparent bridges, according to at least one embodiment. For example, one or more processors 402 may include one or more processing or execution units 408 that can perform aspects of hosts operations described with respect to FIGS. 1-3B. Such aspects may include changes, including for scaling and for modifying windows to be used for translation in an associated NTB.

The computer and processor aspects 400 may be performed by one or more processors 402 that include a system-on-a-chip (SOC) or some combination thereof formed with a processor that may include execution units to execute an instruction, according to at least one embodiment. In at least one embodiment, the computer and processor aspects 400 may include, without limitation, a component, such as a processor 402 to employ execution unit 408 including logic to perform algorithms for process data, in accordance with present disclosure, such as in embodiment described herein. In at least one embodiment, the computer and processor aspects 400 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, the computer and processor aspects 400 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, the computer and processor aspects 400 may include, without limitation, a processor 402 that may include, without limitation, one or more execution units 408 to perform aspects according to techniques described with respect to at least one or more of FIGS. 1-3B and 5-7 herein. In at least one embodiment, the computer and processor aspects 400 may be associated with a single processor desktop or server system, but in another embodiment, the computer and processor aspects 400 may be a multiprocessor system.

In at least one embodiment, the processor 402 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, a processor 402 may be coupled to a processor bus 410 that may transmit data signals between processor 402 and other components in computer and processor aspects 400.

In at least one embodiment, a processor 402 may include, without limitation, a Level 1 ("L1") internal cache memory ("cache") 404. In at least one embodiment, a processor 402 may have a single internal cache or multiple levels of internal cache. In at least one embodiment, cache memory may reside external to a processor 402. Other embodiments may also include a combination of both internal and external caches depending on particular implementation and needs. In at least one embodiment, a register file 406 may store different types of data in various registers including, without limitation, integer registers, floating point registers, status registers, and an instruction pointer register.

In at least one embodiment, an execution unit 408, including, without limitation, logic to perform integer and floating point operations, also resides in a processor 402. In at least one embodiment, a processor 402 may also include a microcode ("ucode") read only memory ("ROM") that stores microcode for certain macro instructions. In at least one embodiment, an execution unit 408 may include logic to handle a packed instruction set 409.

In at least one embodiment, by including a packed instruction set 409 in an instruction set of a general-purpose processor, along with associated circuitry to execute instructions, operations used by many multimedia applications may be performed using packed data in a processor 402. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, an execution unit 408 may also be used in microcontrollers, embedded processors, graphics devices, DSPs, and other types of logic circuits. In at least one embodiment, the computer and processor aspects 400 may include, without limitation, a memory 420. In at least one embodiment, a memory 420 may be a Dynamic Random Access Memory ("DRAM") device, a Static Random Access Memory ("SRAM") device, a flash memory device, or another memory device. In at least one embodiment, a memory 420 may store instruction(s) 419 and/or data 421 represented by data signals that may be executed by a processor 402.

In at least one embodiment, a system logic chip may be coupled to a processor bus 410 and a memory 420. In at least one embodiment, a system logic chip may include, without limitation, a memory controller hub ("MCH") 416, and processor 402 may communicate with MCH 416 via processor bus 410. In at least one embodiment, an MCH 416 may provide a high bandwidth memory path 418 to a memory 420 for instruction and data storage and for storage of graphics commands, data, and textures. In at least one embodiment, an MCH 416 may direct data signals between a processor 402, a memory 420, and other components in the computer and processor aspects 400 and to bridge data signals between a processor bus 410, a memory 420, and a system I/O interface 422. In at least one embodiment, a system logic chip may provide a graphics port for coupling to a graphics controller. In at least one embodiment, an MCH 416 may be coupled to a memory 420 through a high bandwidth memory path 418 and a graphics/video card 412 may be coupled to an MCH 416 through an Accelerated Graphics Port ("AGP") interconnect 414.

In at least one embodiment, the computer and processor aspects 400 may use a system I/O interface 422 as a proprietary hub interface bus to couple an MCH 416 to an I/O controller hub ("ICH") 430. In at least one embodiment, an ICH 430 may provide direct connections to some I/O devices via a local I/O bus. In at least one embodiment, a local I/O bus may include, without limitation, a high-speed I/O bus for connecting peripherals to a memory 420, a chipset, and processor 402. Examples may include, without limitation, an audio controller 429, a firmware hub ("flash BIOS") 428, a wireless transceiver 426, a data storage 424, a legacy I/O controller 423 containing user input and keyboard interfaces 425, a serial expansion port 427, such as a Universal Serial Bus ("USB") port, and a network controller 434. In at least one embodiment, data storage 424 may comprise a hard disk drive, a floppy disk drive, a CD-ROM device, a flash memory device, or other mass storage device.

In at least one embodiment, FIG. 4 illustrates computer and processor aspects 400, which includes interconnected hardware devices or "chips", whereas in other embodiments, FIG. 4 may illustrate an exemplary SoC. In at least one embodiment, devices illustrated in FIG. 4 may be interconnected with proprietary interconnects, standardized interconnects (e.g., PCIe®) or some combination thereof. In at least one embodiment, one or more components of the computer and processor aspects 400 that are interconnected using compute express link (CXL) interconnects.

Figure 5:
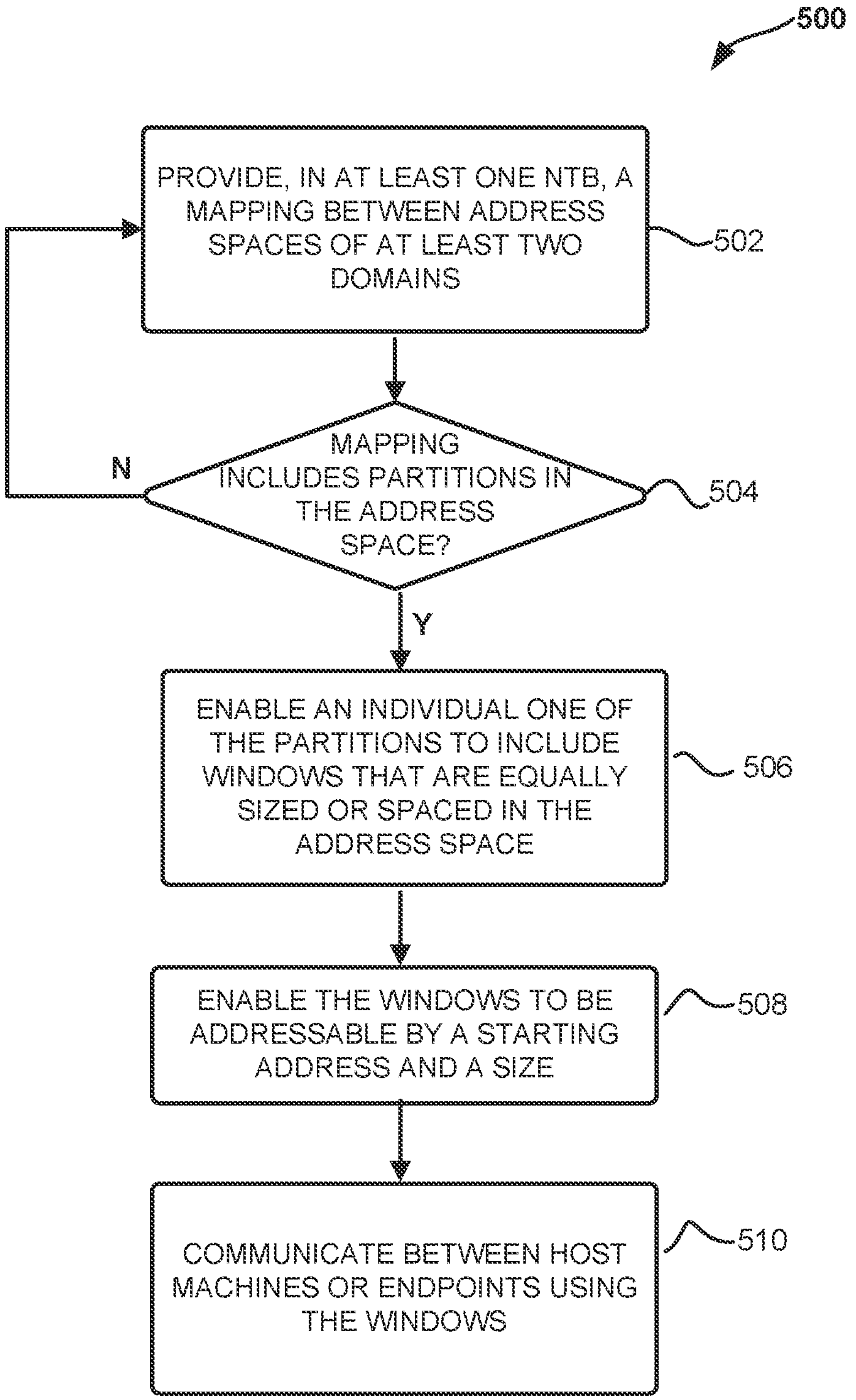
FIG. 5 illustrates a process flow for a system associated with scalable windows and modifiable mapping for peripheral component interconnect express non-transparent bridges, according to at least one embodiment.

FIG. 5 illustrates a process flow or method 500 for a system associated with scalable windows and modifiable mapping for peripheral component interconnect express non-transparent bridges, according to at least one embodiment. The method 500 includes providing 502, in at least one NTB, a mapping between address spaces of at least two domains. A verification may be performed that the mapping includes 504 partitions in the address space. The method 500 includes enabling 506 an individual one of the partitions to include windows that are equally sized or spaced in the address space and that are addressable 508 by a starting address and a size. The method 500 may include communicating 510 between host machines or endpoints using the windows.

In at least one embodiment, the method 500 may include a further step or a sub-step for the mapping to be enabled by a table of the at least one NTB. The table, in an example, can include the starting address and the size. In at least one embodiment, the method 500 may include a further step or a sub-step for providing corridor sections that are equally sized or spaced in the address space and so that at least one of the corridor sections include the partitions. In at least one embodiment, the method 500 may include a further step or a sub-step for the corridor sections being associated with a same NTB function or with different NTB functions.

In at least one embodiment, the method 500 may include a further step or a sub-step for using individual corridor sections to determine a destination domain to be associated with the communication. The method 500 may include determining a window size to be associated with the communication using individual partitions as each partition includes windows that are all equally spaced or sized within the partition. The method 500 includes determining, using an individual window, a translation of an address or an identifier to be used with the communication. The address or identifier may be associated with, such as being translated from, the starting address and size for the window. In at least one embodiment, the mapping is enabled by a table of the at least one NTB. The table is to include the starting address and the size or a representation of the size, such as made in a startup register.

Figure 6:
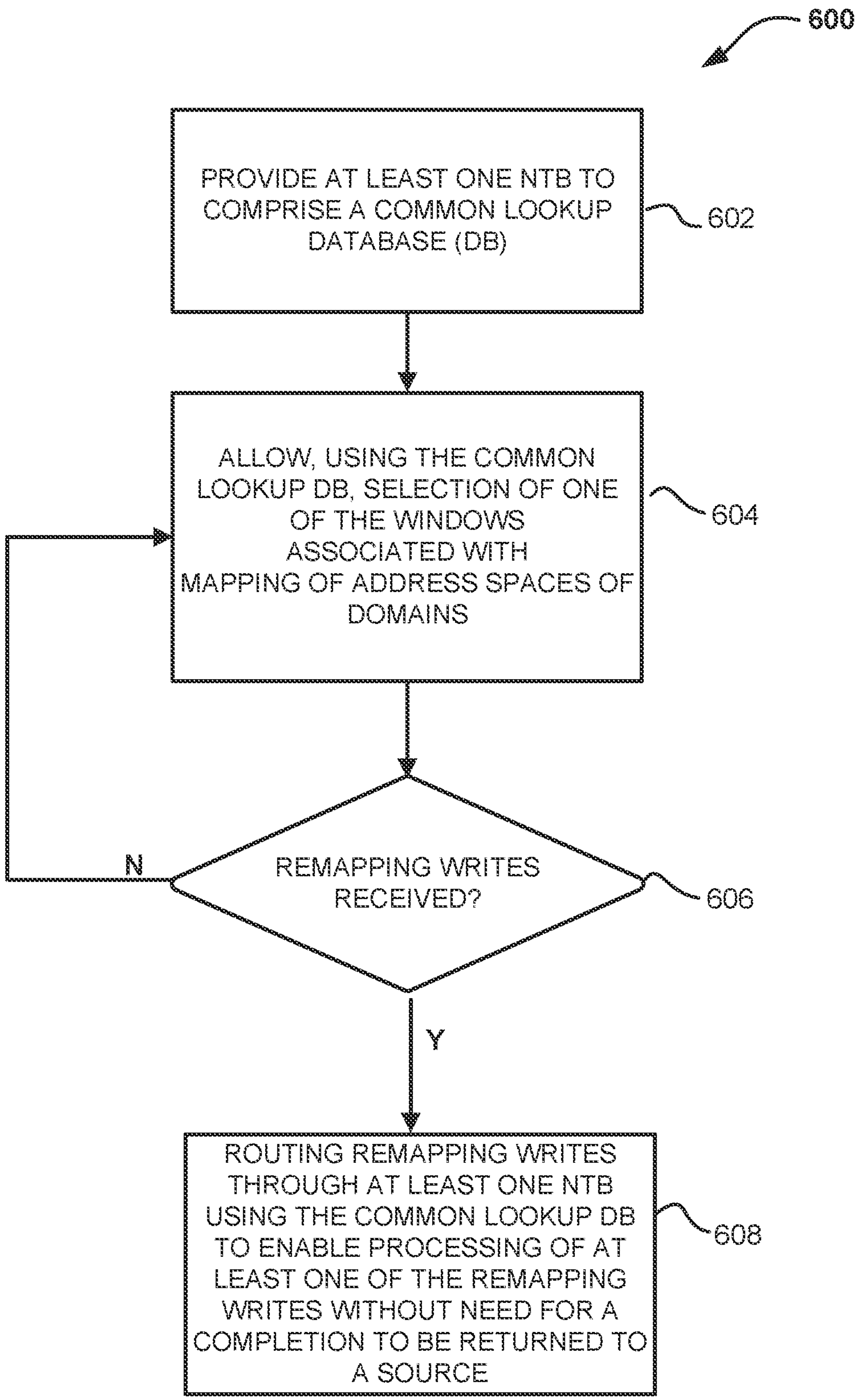
FIG. 6 illustrates yet another process flow for a system associated with scalable windows and modifiable mapping for peripheral component interconnect express non-transparent bridges, according to at least one embodiment.

FIG. 6 illustrates yet another process flow or method 600 for a system associated with scalable windows and modifiable mapping for peripheral component interconnect express non-transparent bridges, according to at least one embodiment. The method 600 includes providing 602 at least one NTB to include a common lookup database. The method 600 also includes allowing 604, using the common lookup table, selection of one of provided windows of a address space. The window may be associated with a mapping between address spaces of different domains. The method 600 includes verifying 606 whether a TLP received is a remapping write. The method 600 includes routing 608 the remapping writes using the common lookup table, through the at least one NTB to enable processing of at least one of the remapping writes without need for a completion to be returned to a source of the at least one the remapping writes.

In at least one embodiment, the method 600 may include a further step or a sub-step for the common lookup database to be a shared and a sectioned database that is enabled for multiple accesses in a clock cycle. For example, the common lookup database is sectioned to different domains. A data access for a domain is routed to an individual corridor section of multiple provided corridor sections. The individual corridor section enables determination of a domain to be associated with the data access. Further, individual partitions of provided multiple partitions within the individual corridor section enable determination of a window size to be associated with the data access. Finally, an individual window of the window size enables determination of a translation of an address or an identifier to be used with the data access.

In at least one embodiment, the method 600 may include a further step or a sub-step for providing multiple windows in a data BAR, where the multiple windows are associated with multiple translations between the address spaces of the different domains and where individual ones of the multiple windows can determine the translation provided for an address associated with a TLP. Further, the method 600 includes enabling, using a transaction layer packet (TLP) associated with a remapping write, modification to the multiple translations by an access to a control BAR.

In at least one embodiment, the remapping write to a control BAR can be applied upon receipt in the control BAR. This is so that a first data access that is prior to the remapping write being applied can be translated by a first translation of the plurality of translations. Then, a second data access, after the remapping write being applied, can be translated using a second translation of the plurality of translations. Further, the modifying of the mapping is instructed, using a transaction layer packet (TLP) associated with one of the remapping writes, by a first host on a first PCIe domain or a second host on a second PCIe domain.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors.

In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

Accordingly, in at least one embodiment, computer systems are configured to implement one or more services that singly or collectively perform operations of processes described herein and such computer systems are configured with applicable hardware and/or software that allow performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. References may also be made to providing, outputting, transmitting, sending, or presenting analog or digital data. In at least one embodiment, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system for addressing in Non-Transparent Bridges (NTBs), comprising at least one NTB to comprise:

a mapping between address spaces of at least two domains, the mapping to comprise a plurality of corridor sections that are equally sized or spaced, wherein at least one of the plurality of corridor sections comprises a plurality of partitions, the plurality of partitions comprising a plurality of windows that are equally sized or spaced and that are addressable by a starting address and a size, the plurality of windows to support communication between host machines or endpoints.

2. The system of claim 1, wherein an individual window of the plurality of windows enables determination of a translation of an address or an identifier to be used with the communication.

3. The system of claim 1, wherein a first size of first individual windows of a first partition of the plurality of windows is different than a second size of second individual windows of a second partition of the plurality of windows.

4. The system of claim 3, wherein individual partitions of the plurality of partitions enable determination of a window size to be associated with the communication.

5. The system of claim 1, wherein the plurality of corridor sections is associated with a same NTB function or with different NTB functions.

6. The system of claim 1, wherein individual corridor sections of the plurality of corridor sections enable determination of a destination domain to be associated with the communication.

7. A method for addressing in Non-Transparent Bridges (NTBs), comprising:

providing, in at least one NTB, a mapping between address spaces of at least two domains, the mapping comprising a plurality of corridor sections that are equally sized or spaced, wherein at least one of the plurality of corridor sections comprises a plurality of partitions, the plurality of partitions comprising a plurality of windows that are equally sized or spaced in at least one of the address spaces;

enabling the plurality of windows to be addressable by a starting address and a size; and communicating between host machines or endpoints using the plurality of windows.

8. The method of claim 7, wherein an individual window of the plurality of windows enables determination of a translation of an address or an identifier to be used with the communication.

9. The method of claim 7, wherein a first size of first individual windows of a first partition of the plurality of windows is different than a second size of second individual windows of a second partition of the plurality of windows.

10. The method of claim 7, wherein the plurality of corridor sections is associated with a same NTB function or with different NTB functions.

11. The method of claim 7, further comprising:

determining a destination domain to be associated with the communication using individual corridor sections of the plurality of corridor sections;

determining a window size to be associated with the communication using individual partitions of the plurality of partitions; and determining, using an individual window of the plurality of windows, a translation of an address or an identifier to be used with the communication.

12. A system for addressing in Non-Transparent Bridges (NTBs), comprising one or more processors to utilize;

a mapping between address spaces of at least two domains to support communication between host machines or endpoints, the mapping to comprise a plurality of corridor sections that are equally sized or spaced, wherein at least one of the plurality of corridor sections comprises a plurality of partitions, the plurality of partitions comprising a plurality of windows that are equally sized or spaced and that are addressable, for the communication, by a starting address and a size.

13. The system of claim 12, wherein an individual window of the plurality of windows enables determination of a translation of an address or an identifier to be used with the communication.

14. The system of claim 12, wherein a first size of first individual windows of a first partition of the plurality of windows is different than a second size of second individual windows of a second partition of the plurality of windows.

15. The system of claim 14, wherein individual partitions of the plurality of partitions enable determination of a window size to be associated with the communication.

16. The system of claim 12, wherein the plurality of corridor sections is associated with a same NTB function or with different NTB functions.

17. The system of claim 12, wherein individual corridor sections of the plurality of corridor sections enable determination of a destination domain to be associated with the communication.

* * * * *